Figure 1:
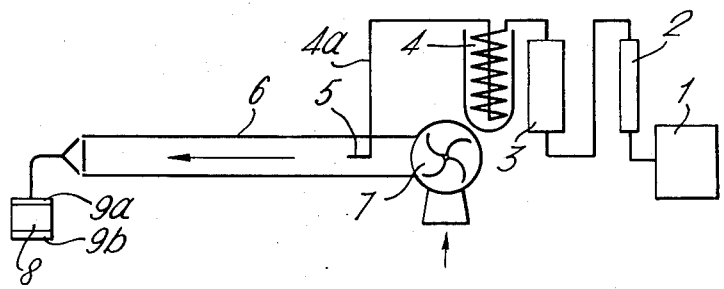

March 15, 1966  G. J. C. NASH  3,240,555
FISSION PRODUCTS EXTRACTION PROCESSES
Filed Dec. 27, 1961  4 Sheets-Sheet 1

United States Patent Office 3,240,555
Patented Mar. 15, 1966

3,240,555
FISSION PRODUCTS EXTRACTION PROCESSES
Geoffrey James Chetewoode Nash, Dorchester, Dorset, England, assignor to United Kingdom Atomic Energy Authority, London, England
Filed Dec. 27, 1961, Ser. No. 162,497
Claims priority, application Great Britain, Dec. 30, 1960, 44,757/60
3 Claims. (Cl. 23—2)

This invention relates to the extraction by absorption systems of volatile radioactive atomic species from gaseous streams containing these species.

Various methods of extraction have been proposed hitherto involving absorbing systems wherein the gaseous stream is passed over an absorbent with the object that the absorber should absorb and retain the species from the stream. Examples of absorbents proposed are: a a charcoal bed, a coil of metallic wire and a liquid stream passed in counter-current to the gaseous stream. However, the efficient operation of plant designed to operate on these lines is seen to be impaired by the multiplicity of states of combination exhibited by the radioactive atomic species.

Thus, although at present the most promising of the absorption processes appears to be that in which the gaseous stream is passed through a bed of charcoal, the efficiency of this process as related, for example, to the removal of radioactive iodine may vary considerably according to whether the iodine has been previously absorbed on particulate matter, exists as iodate, as periodate or as molecular iodine or in fact any other complex combined form. Absorption is efficient only where the substance to be extracted is in a suitable form.

It has been noted by a number of workers that although molecular iodine in the vapour phase is readily absorbed on to active carbon, it is not readily removed from the gas stream once it has formed an aerosol by being absorbed on to the minute dust particles which are always present. In this form it is able to penetrate active carbon absorbent and the formation of such an aerosol can reduce the efficiency of absorption from almost 100% to as low as 10%. Thus a serious loss of active iodine can occur, particularly if the absorption trap must be remote from the source of active iodine so that aerosols have time to form before the trap is reached.

According to the invention there is provided an absorption process for the extraction of a volatile radioactive isotope of an element in a stream of carrier gas which comprises flowing the gas stream along a flow path which includes an absorbent whilst effecting an exchange reaction in said flow path between the radioactive isotope and a natural, non-radioactive, form of the same element.

The atoms of any volatile substance absorbed on to a surface are in a state of dynamic equilibrium with other atoms in the vapour phase, i.e. there is a constant exchange between the solid surface and the vapour phase. This will be the case with radioactive atoms absorbed on to the aerosol particles. When, therefore, a relatively large concentration of non-active iodine is introduced at an appropriate part of the system, these atoms will take part in the exchange reaction and will cause desorption of the greater part of the radioactive species from the aerosol and so render it absorbable by the trap.

The exchange reaction may be effected by injecting sufficient quantity of the natural, non-radioactive, form of the element into a gas stream upstream (i.e. on the inlet side), of a bed or filter of absorbent material to bring about the exchange reaction in the flowing stream prior to the entry of the stream into the bed. The absorbent material may be activated charcoal. Some forms of activated charcoal have a saturation capacity for natural elements, e.g. iodine, of about 700 kilograms/cu. meter, whereas their capacity for radioactive isotopes of the same elements in a waste gas stream can be less than 1% of this. Hence by effecting the exchange reaction between the natural and radioactive forms of a given element somewhere between bed entry and bed exit, the absorption capacity of the bed for the radioactive species can be significantly increased.

In a facility for processing radioactive material the effluent from fume cupboards is normally passed through filters into the atmosphere and it is particularly important that extraction of the pernicious radioactive elements from the effluent be highly efficient. A similar consideration arises in processing outlet gas from a nuclear reactor or a nuclear reactor fuel processing facility where the outlet gas may be purified for re-cycling or purified prior to release to atmosphere.

The invention in this aspect resides in a nuclear reactor installation having a flow path for a gas stream containing volatile fission products, said flow path including a region containing absorbent material through which the gas stream is passed and means for effecting at some part of said flow path exchange between at least one volatile radioactive isotope of an element and a natural non-active form of the same element whereby the absorption coefficient of said absorbent is increased. The radioactive isotope may be one having atomic number 38, 51, 52, 53, 55 or 56.

Figure 2:
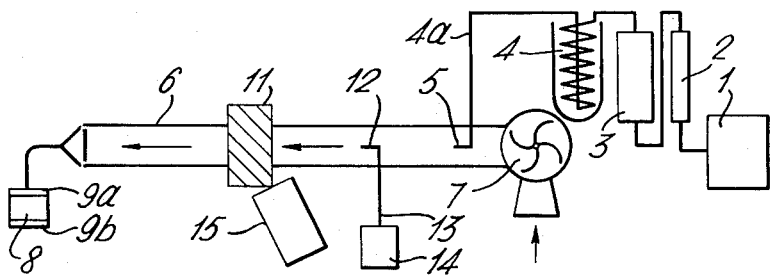
Figure 3:
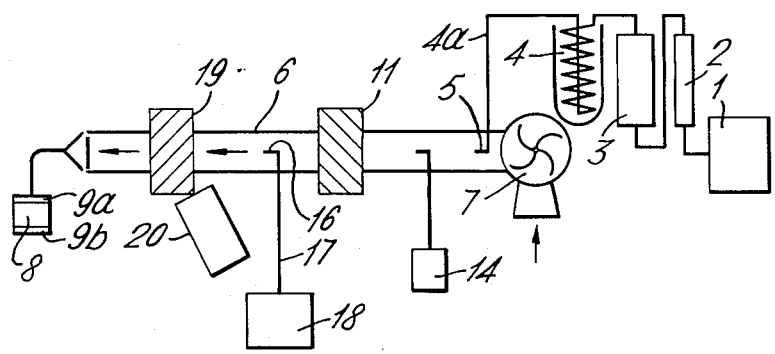
Figure 4:
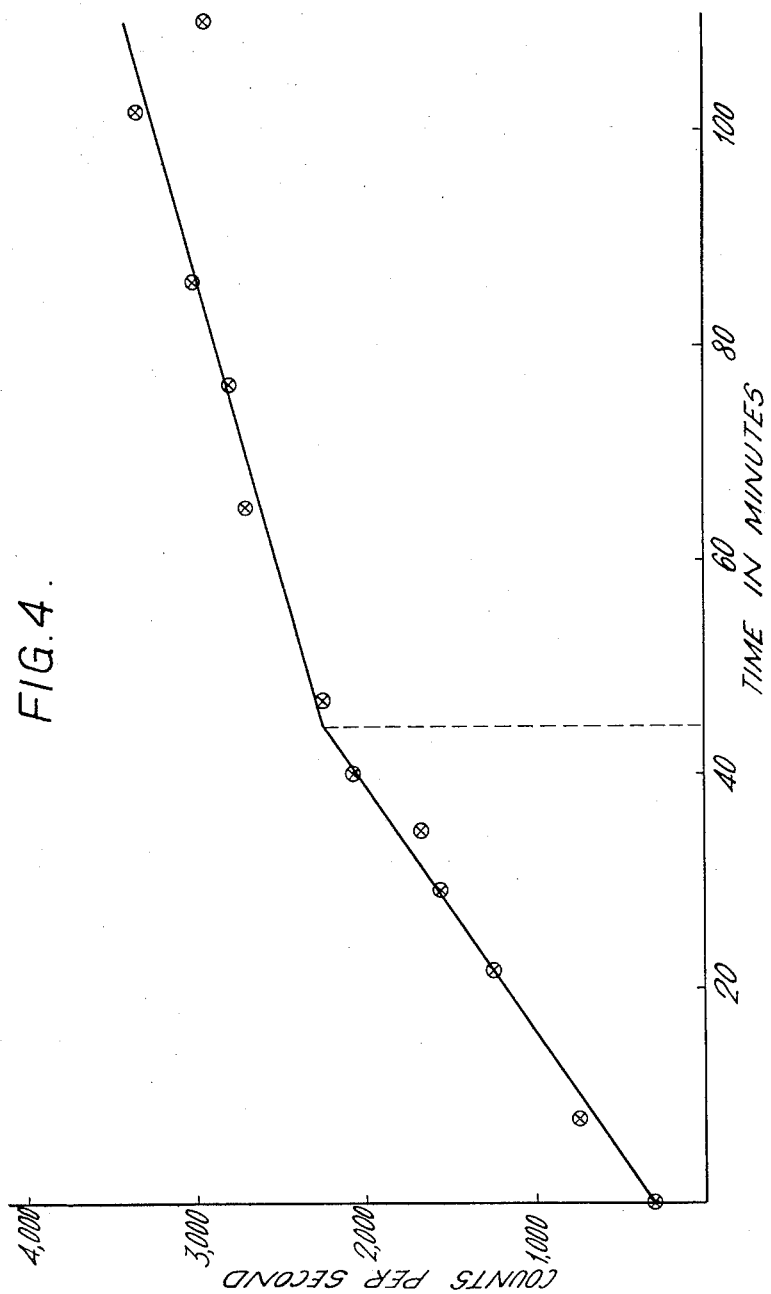
Figure 5:
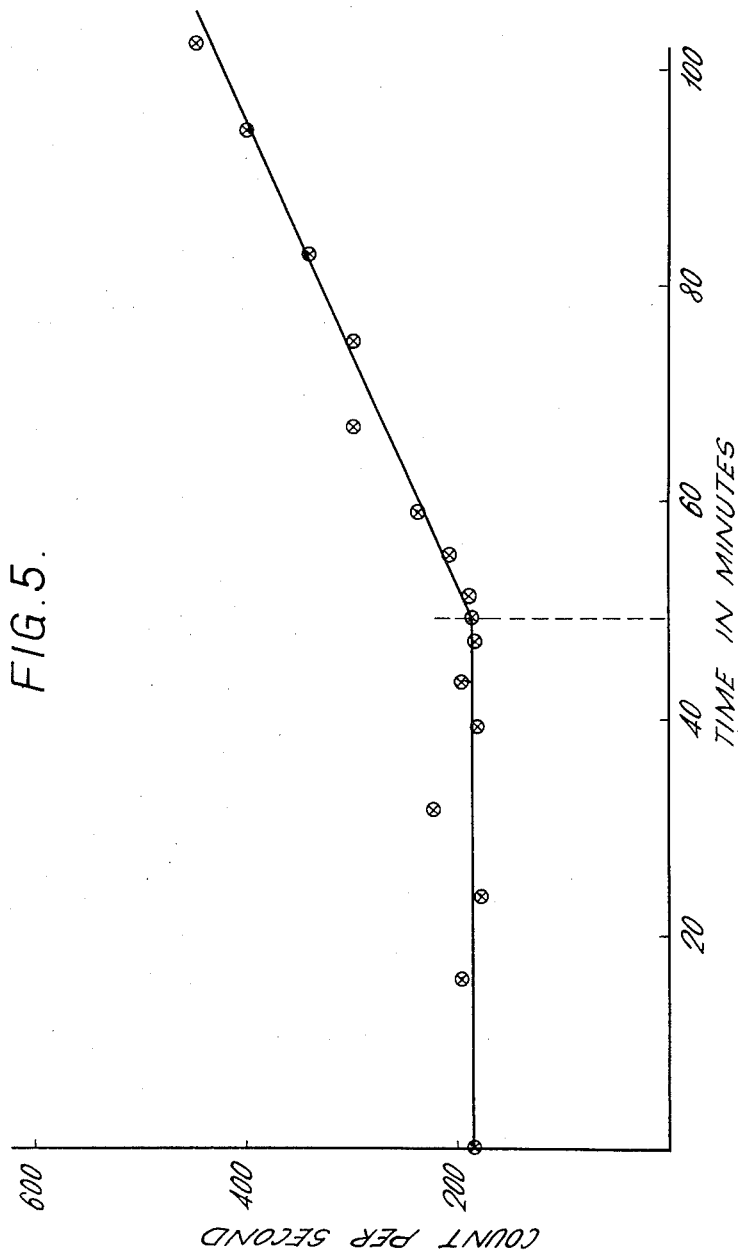
Figure 6:
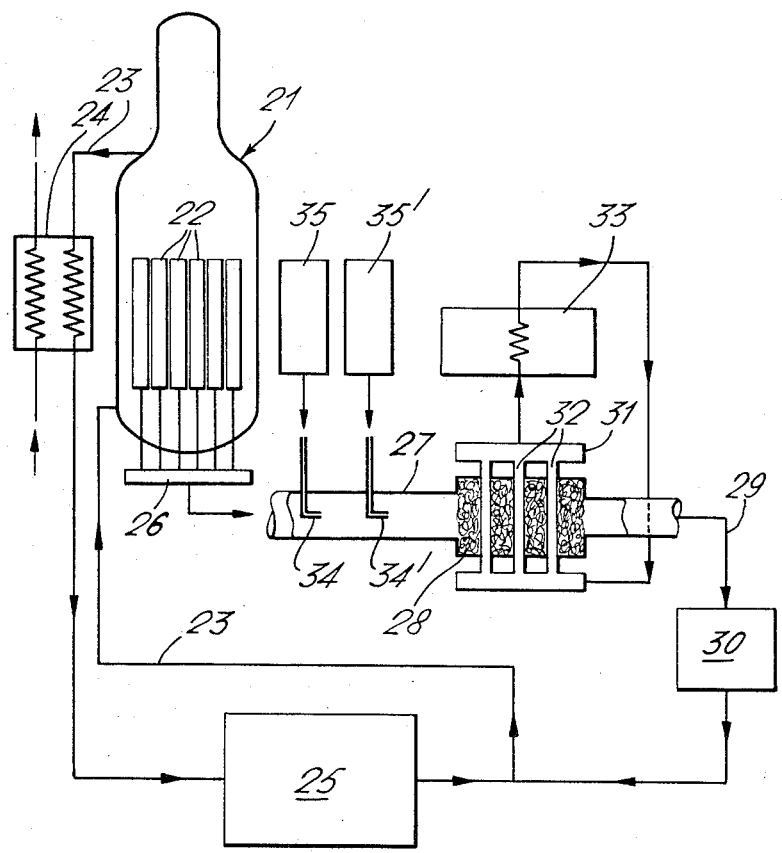

The invention can be better understood if reference is made to a series of experiments hereinafter designated A, B and C, and then to a nuclear reactor installation which will now be described with reference to the accompanying drawings in which;

FIG. 1 shows the apparatus employed for Experiment A, the object of which is to show the efficiency with which radioiodine is removed from a gas stream by a particular filter, FIG. 2 shows the apparatus of FIG. 1 modified for Experiment B to show the effect of added dust particles, FIG. 3 shows the apparatus of FIG. 2 modified for Experiment C to demonstrate the effect of the exchange reaction, FIGS. 4 and 5 show in graphical form the rate of increase of gamma activity in certain charcoal filters or traps of Experiments B and C respectively, and FIG. 6 is a diagrammatic view of the invention as applied to a nuclear reactor. Where similar component parts are used in FIGS. 1, 2, and 3, the same reference numerals are employed.

EXPERIMENT A

A nitrogen source 1 was connected serially with a rotameter 2, a gas dryer 3 and an iodine saturator 4. The outlet of the saturator 4 was connected by a pipe 4a to an injector 5 mounted within a duct 6. The duct 6 was connected at one end to the outlet of a fan 7 and at the other end to an air sampler 8 incorporating an interruptably operable suction pump with filter papers 9a, 9b, mounted over the pump inlet and outlet respectively. The filter papers 9a, 9b, were of a charcoal impregnated, glass fibre paper type. A single channel gamma spectrometer (not shown) was mounted adjacent the adjacent the filters 9a, 9b.

A supply of dust free aid was passed along the duct 6 by the fan 7 in the direction indicated by the arrow. Nitrogen gas from the source 1 was passed through the rotameter 2 and dryer 3 into a saturator 4. A slow moving stream of nitrogen saturated with active iodine at a given temperature then passed through pipe 4a and ejected by the injector 5 into the dust free air stream.

The gamma activity of the papers 9a 9b, was counted separately by the spectrometer and the following results were obtained.

*Table 1*

| Iodine saturator temp., N₂ flow 100 cc./m. | Counts/min. (corrected for background radiation) for a 75 litre air sample | |
|---|---|---|
| | Filter 9a (front) | Filter 9b (back) |
| −60° C | 780 | 30 |
| | 850 | 33 |
| | 760 | 29 |
| −50° C | 5,600 | 56 |
| | 6,400 | 76 |
| | 5,200 | 42 |
| | 6,100 | 51 |
| −40° C | 49,500 | 150 |
| | 54,000 | 185 |
| | 45,000 | 220 |
| | 47,500 | 140 |

These experimental results indicate the order of efficiency of absorption, obtained using a dust free air as the main carrier for the radioiodine and show that by controlling the temperature of the saturator it is possible to regulate the rate of injection of radioiodine. In the successive Experiments B and C, the saturator was maintained at −50° C.

EXPERIMENT B

The apparatus shown in FIG. 1 was then modified as shown in FIG. 2 for Experiment B to show the effect of aerosol formation.

To this end, an active charcoal trap 11 was inserted in the duct 6 downstream of the injector 5 and a second injector 12 was mounted between the injector 5 and the trap 11. A pipe 13 connected the second injector 12 with a silica dust supply 14. A scintillation counter 15 was positioned outside the duct 6 adjacent the trap 11. The remainder of the apparatus was unchanged.

The fan was operated to pass a stream of dust free air along the duct 6 and $I_{131}$ vapour, devoid of water vapour, was injected into the air stream through the injector 5. The counter was operated to measure the rate of build up of $I^{131}$ gamma activity in the trap 11 and the spectrometer employed to make similar measurements of the filter paper 9a, 9b, of the air sampler. These measurements were continued when after 40 minutes silica dust was introduced into the air stream through the injector 12 and measurements continued for a further 60 minutes.

The results obtained from the scintillation counter are shown in FIG. 4 where the start of dust injection is indicated by a vertical broken line. This shows that after aerosol formation was permitted, the rate of absorption of the $I^{131}$ on the trap 11 decreased markedly.

The following table shows the corresponding count rate obtained from the gamma spectrometer. The increase in count rate after dust injection indicates the fall in efficiency of the trap 11 after dust injection.

*Table 2*

| Sample Number | Counts/min. (corrected for background radiation) for a 75 litre sample |
|---|---|
| No dust addition: | |
| 1 | 30 |
| 2 | 55 |
| 3 | 15 |
| 4 | 25 |
| Dust added: | |
| 1 | 550 |
| 2 | 470 |
| 3 | 380 |
| 4 | 440 |

EXPERIMENT C

An exchange reaction between the radioactive isotope $I^{131}$ and natural iodine $I^{127}$ was effected in Experiment C, in order to show its effect on the trapping efficiency. The apparatus was modified as in FIG. 3, i.e. a further injector 16 was introduced in the duct 6 downstream of trap 11 and this was connected via pipe 17 with a natural iodine volatiliser 18.

An additional active charcoal trap 19 was inserted in the duct 6 downstream of the injector 16. A scintillation counter 20 was located adjacent trap 19. The apparatus was operated as in Experiment B, both without, and with, natural iodine injection through injector 16 and the effect of adding natural iodine in the vapour phase was followed by measuring the rate of build up of activity in the trap 19 without, and with, the addition of $I^{127}$ vapour to the gas stream.

The result shown graphically in FIG. 5 indicates the improvement in the rate of absorption of $I^{131}$ in trap 19 resulting from the injection of $I^{127}$, the vertical dotted line indicating the injection point of $I^{127}$.

Air samples taken downstream of trap 19 in the filter papers 9a, 9b, gave the following results.

*Table 3*

| Sample Number | Counts/min. (corrected for background radiation) for a 75 litre sample |
|---|---|
| No $I^{127}$ addition: | |
| 1 | 380 |
| 2 | 340 |
| 3 | 300 |
| $I^{127}$ added: | |
| 4 | 60 |
| 5 | 75 |
| 6 | 94 |
| 7 | 81 |
| 8 | 55 |

This quite clearly shows the decrease in the activity of the filter papers after the addition of $I^{127}$.

SUMMARY

The above experiments show quite clearly that when fine particles are introduced into an air stream carrying $I^{131}$ vapour the efficiency with which the iodine is trapped by active charcoal is reduced. They also show that the addition of $I^{127}$ vapour does cause most of this escaping $I^{131}$ to be converted into a more easily trapped form.

Whilst the particular experiments described above relate to one particular atomic specie, it will be evident that it can be applied to any volatile isotope.

Thus the invention finds application in the gas cooled nuclear reactor system in which an active coolant gas stream is required to be purified before re-cycling into the main coolant volume.

Such a reactor system (one example of which has been described in Nuclear Engineering, July 1960), is shown diagrammatically in FIG. 6 in which a nuclear reactor 21 has fuel elements 22 cooled by gas circulated in loop 23 through heat exchanger 24, coolant gas purification plant 25 back to the reactor. A fission product purge gas stream is simultaneously drawn through the fuel elements 22 into a manifold 26 and thence is ducted by conduit 27 to a fission product trap 28 e.g. containing activated charcoal. From the outlet of the trap conduit 27 is connected by pipe 29 with delay beds 30 in which any elements passing through the trap 28 are allowed to decay to less active species. After suitable delay, the gas may be passed back to the coolant loop 23. The trap 28 may be cooled by a suitable closed circuit heat exchanger system 31 in which a coolant fluid is passed through channels 32 in the trap 28 and through a heat exchanger 33.

In order to enhance the efficiency of the trap 18, a number of injectors 34, 34¹, are inserted in the duct 27 upstream of the trap 28 and connected respectively to dispensers 35, 35¹. The dispensers are each designed to generate different natural isotopes, the radioactive form of which is entrained as vapour in the gas stream in the conduit 27. For example, the dispenser 35 may generate tellurium vapour which is injected into the conduit 27 via injector 34 whilst the dispenser 35¹ may generate iodine vapour ($I^{127}$) which is injected into the conduit 27 via injector 34¹. The radioactive species of tellurium and iodine in the purge gas stream, which will have formed aerosols, will undergo exchange reactions with the corresponding natural isotopes injected, to reconvert the absorbed radioactive species to the vapour phase. As such they are in a more absorbable form when they pass into the trap 28.

I claim:

1. A process for the extraction of a radioactive isotope of an element present in a stream of carrier gas containing an aerosol comprising flowing the stream along a flow path which includes a bed of absorbent, introducing a natural form of said element in the vapor state into said flow path to effect an exchange reaction between the radioactive isotope absorbed on said aerosol and the natural form of the element to displace the radioactive isotope from said aerosol into the vapor phase, and passing the stream through said bed of absorbent to preferentially remove a radioactive isotope from said carrier gas stream.

2. A method according to claim 1 wherein the natural form of said element is introduced into said stream prior to passing the stream through said bed of absorbent.

3. A process as claimed in claim 1 in which the radioactive isotope is one selected from the group consisting of elements having atomic number 38, 51, 52, 53, 55 and 56.

References Cited by the Examiner

UNITED STATES PATENTS

| | | | |
|---|---|---|---|
| 2,710,249 | 6/1955 | Winsche et al. | 252—301.1 X |
| 2,987,459 | 6/1961 | La Beyrie et al. | 176—19 |
| 2,998,519 | 8/1961 | Tunnicliffe et al. | 176—19 |
| 3,039,948 | 6/1962 | Krucoff | 176—37 |
| 3,080,307 | 3/1963 | Rinald | 252—301.1 X |
| 3,093,564 | 6/1963 | Weisman et al. | 252—301.1 X |

OTHER REFERENCES

Proceedings of the Second United Nations International Conference on the Peaceful Uses of Atomic Energy, vol. 18, United Nations, Geneva (1958, pp. 184–189).

Progress in Nuclear Reactors Series II Editors: Charpie et al., McGraw-Hill Book Co., N.Y., 1956, pp. 367–374.

L. Silverman: Proc. of the International Conf. on the Peaceful Uses of Atomic Energy, vol. 9, 1956, pp. 727–734.

M. Steinberg and B. Manowitz: An Absorption Process for Recovery of Fission Product Gases, BNL–493 (T–115), February 1958, pages 1–4.

Radioactivity Applied to Chemistry by A. C. Wahl et al., John Wiley and Sons, N.Y., 1951, pp. 6 and 7.

REUBEN EPSTEIN, *Primary Examiner.*

CARL D. QUARFORTH, *Examiner.*